(12) United States Patent
Tang

(10) Patent No.: US 12,081,567 B2
(45) Date of Patent: Sep. 3, 2024

(54) ANALYSIS DEVICE, METHOD AND SYSTEM FOR OPERATIONAL TECHNOLOGY SYSTEM AND STORAGE MEDIUM

(71) Applicant: Siemens Aktiengesellschaft, Munich (DE)

(72) Inventor: Wen Tang, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 878 days.

(21) Appl. No.: 17/052,254

(22) PCT Filed: May 3, 2018

(86) PCT No.: PCT/CN2018/085473
§ 371 (c)(1),
(2) Date: Nov. 2, 2020

(87) PCT Pub. No.: WO2019/210484
PCT Pub. Date: Nov. 7, 2019

(65) Prior Publication Data
US 2021/0194909 A1    Jun. 24, 2021

(51) Int. Cl.
*H04L 9/40*     (2022.01)
*G06N 20/00*   (2019.01)

(52) U.S. Cl.
CPC ......... *H04L 63/1425* (2013.01); *G06N 20/00* (2019.01); *H04L 63/1416* (2013.01); *H04L 63/20* (2013.01)

(58) Field of Classification Search
CPC ............. H04L 63/1425; H04L 63/1416; H04L 63/1433; H04L 63/145; H04L 63/20
See application file for complete search history.

(56) References Cited

U.S. PATENT DOCUMENTS 9,009,084 B2   4/2015   Brandt et al.
9,202,052 B1   12/2015  Fang et al.
(Continued)

FOREIGN PATENT DOCUMENTS

CN   103916399 A   7/2014
CN   104008332 A   8/2014
(Continued)

OTHER PUBLICATIONS

X. Wang, Q. Tan, J. Shi, S. Su and M. Wang, "Insider Threat Detection Using Characterizing User Behavior," 2018 IEEE Third International Conference on Data Science in Cyberspace (DSC), Guangzhou, China, 2018, pp. 476-482. (Year: 2018).*

(Continued)

*Primary Examiner* — Kari L Schmidt
(74) *Attorney, Agent, or Firm* — Harness, Dickey & Pierce, P.L.C.

(57) ABSTRACT

Embodiments of the invention relates to the technical field of industrial networks and information security, in particular to an analysis device, method and/or system for an operational technology system and a storage medium. The device includes a parsing module configured to acquire first data related to the operational technology system from a data storage area, and parse out first features of the first data; an identifying module configured to identify an abnormal feature from the first features; and a model generation module configured to acquire second data related to the abnormal feature from the data storage area, and generate an algorithm model based on the second data, where the algorithm model is used for identifying an attack behavior related to the abnormal feature. The attack behavior can be automatically identified, and complementation of the advantages of human intelligence and the advantages of artificial intelligence is realized.

17 Claims, 7 Drawing Sheets

(56) References Cited

U.S. PATENT DOCUMENTS

| | | | |
|---|---|---|---|
| 9,699,142 B1* | 7/2017 | Allen | H04L 67/306 |
| 9,727,723 B1* | 8/2017 | Kondaveeti | H04L 63/1425 |
| 9,773,112 B1* | 9/2017 | Rathor | G06F 21/554 |
| 10,291,638 B1* | 5/2019 | Chandana | H04L 63/1441 |
| 10,521,490 B2* | 12/2019 | Nakabayashi | G06Q 10/06 |
| 10,678,912 B2* | 6/2020 | Mestha | H04L 67/12 |
| 10,911,465 B1* | 2/2021 | Au | H04L 63/20 |
| 11,003,773 B1* | 5/2021 | Fang | H04L 63/0263 |
| 2008/0127346 A1* | 5/2008 | Oh | G06F 21/552 726/23 |
| 2008/0196103 A1 | 8/2008 | Lin et al. | |
| 2014/0114442 A1* | 4/2014 | Li | G06F 11/0736 700/47 |
| 2014/0137257 A1 | 5/2014 | Martinez et al. | |
| 2015/0381637 A1 | 12/2015 | Raff et al. | |
| 2016/0048681 A1* | 2/2016 | Fang | G06F 21/552 726/23 |
| 2016/0148103 A1* | 5/2016 | Sarrafzadeh | G06N 20/00 706/46 |
| 2016/0371489 A1* | 12/2016 | Puri | G06F 16/254 |
| 2017/0093910 A1 | 3/2017 | Gukal et al. | |
| 2017/0171235 A1 | 6/2017 | Mulchandani et al. | |
| 2017/0230391 A1* | 8/2017 | Ferguson | G06N 7/01 |
| 2019/0123975 A1* | 4/2019 | Telles | H04L 63/0227 |
| 2019/0260779 A1* | 8/2019 | Bazalgette | H04L 41/22 |
| 2020/0358792 A1* | 11/2020 | Bazalgette | G06N 20/00 |
| 2022/0159467 A1* | 5/2022 | Koral | H04L 63/0876 |
| 2023/0185906 A1* | 6/2023 | Paranjape | G06F 18/2413 726/22 |

FOREIGN PATENT DOCUMENTS

| | | |
|---|---|---|
| CN | 104753946 A | 7/2015 |
| CN | 106209826 A | 12/2016 |
| CN | 106502234 A | 3/2017 |
| EP | 3179696 A1 | 6/2017 |

OTHER PUBLICATIONS

H. Tribak, B. L. Delgado-Márquez, P. Rojas, O. Valenzuela, H. Pomares and I. Rojas, "Statistical analysis of different artificial intelligent techniques applied to Intrusion Detection System," 2012 International Conference on Multimedia Computing and Systems, Tangiers, Morocco, 2012, pp. 434-440. (Year: 2012).*

Kumar, Gulshan, and Krishan Kumar. "AI based supervised classifiers: an analysis for intrusion detection." Proceedings of the International Conference on Advances in Computing and Artificial Intelligence. 2011, pp. 170-174 (Year: 2011).*

International Search Report PCT/ISA/210 for International Application No. PCT/CN2018/085473 dated Jan. 30, 2019.

Written Opinion of the International Searching Authority PCT/ISA/237 for International Application No. PCT/CN2018/085473 dated Jan. 30, 2019.

Extended European Search Report dated Sep. 29, 2021.

Chen Xingshu , Zeng Xuemei , Wang Wenxian ,et al . Big data analytics for network security and intelligence [J]. Advanced Engineering Sciences , 2017 , 49 (3) : 1-12.

* cited by examiner

ANALYSIS DEVICE, METHOD AND SYSTEM FOR OPERATIONAL TECHNOLOGY SYSTEM AND STORAGE MEDIUM

PRIORITY STATEMENT

This application is the national phase under 35 U.S.C. § 371 of PCT International Application No. PCT/CN2018/085473 which has an International filing date of May 3, 2018, which designated the United States of America, the contents of each of which are hereby incorporated by reference herein, in their entirety and for all purposes.

BACKGROUND

Field

Embodiments of the invention generally relate to the technical field of industrial networks and information security, in particular to an analysis device, method and system for an operational technology (OT) system and a storage medium.

Background

An OT system, also referred to as an Industrial Control System (ICS), is configured to implement automatic control of industrial processes. An OT system can be a wind power system, a car manufacturing plant, a pharmaceutical factory, a municipal sewage treatment system, and the like.

A traditional OT system adopts a closed design, and network attacks are hardly a threat to it. However, with the development of automated manufacturing and process control technologies, Information Technology (IT) is widely used in the OT system, making the system no longer a closed system. Therefore, security threats faced by the OT system are increasingly serious, and the need for protecting the OT system against security attacks has become urgent. For example, a network of a joint venture or subsidiary, or even a service outsourcing company of an industrial enterprise, may be connected to the OT system of the industrial enterprise, which poses a risk of network attacks.

SUMMARY

The inventors have discovered that complexity and variability of OT systems increase the difficulty of security analysis. The inventors have discovered that how to effectively perform security analysis and monitoring on a complex, dynamically changing OT system has become an urgent problem.

Embodiments of the invention disclose an analysis device, method and system for an OT system and a storage medium.

A first embodiment of the analysis device for the OT system comprises:
 a parsing module configured to acquire first data related to the OT system from a data storage area, and parse out first features of the first data;
 an identifying module configured to identify an abnormal feature from the first features; and
 a model generation module configured to acquire second data related to the abnormal feature from the data storage area, and generate an algorithm model based on the second data, where the algorithm model is used for identifying an attack behavior related to the abnormal feature.

In a second embodiment, an analysis system comprises:
 a data acquisition device configured to collect original data of the OT system;
 a data processing device configured to perform data preparation on the original data, perform post-processing on the data after data preparation, and perform real-time anomaly detection on the data after data preparation and the data after post-processing according to a machine learning algorithm;
 a storage device configured to provide first data related to the OT system, wherein the first data comprise the original data, the data after data preparation, and the post-processed data; and
 an analysis device configured to acquire the first data related to the OT system, parse out first features of the first data, identify an abnormal feature from the first features, acquire second data related to the abnormal feature from the storage device, generate an algorithm model based on the second data, and send the algorithm model to the data processing device, where the algorithm model is used for identifying an attack behavior related to the abnormal feature;
 wherein the data processing device is further configured to update the machine learning algorithm based on the algorithm model.

In a third embodiment, an analysis method for an OT system is provided. The method comprises:
 acquiring first data related to the OT system from a data storage area, and parsing out first features of the first data;
 identifying an abnormal feature from the first features; and
 acquiring second data related to the abnormal feature from the data storage area, and generating an algorithm model based on the second data, where the algorithm model is used for identifying an attack behavior related to the abnormal feature.

In a fourth embodiment, an analysis method for an OT system is provided, comprising:
 collecting original data of the OT system;
 performing data preparation on the original data, performing real-time anomaly detection on the data after data preparation according to a machine learning algorithm, and performing post-processing on the data after data preparation;
 providing first data related to the OT system, wherein the first data comprise the original data, the data after data preparation, and the post-processed data;
 acquiring the first data related to the OT system, parsing out first features of the first data, identifying an abnormal feature from the first features, acquiring second data related to the abnormal feature from the data storage area, and generating an algorithm model based on the second data, wherein the algorithm model is used for identifying an attack behavior related to the abnormal feature; and
 updating the machine learning algorithm based on the algorithm model.

In a fifth embodiment, an analysis device for an OT system is provided. The device comprises a processor and a memory, and an application executable by the processor is stored in the memory for causing the processor to perform the analysis method for the OT system according to any one of the embodiments.

In a sixth embodiment, a computer-readable storage medium is provided, and computer-readable instructions are stored therein for performing the analysis method for the OT system according to any one of the embodiments.

In a seventh embodiment, a machine-readable medium is provided, and machine-readable instructions are stored thereon for performing the method provided by any one of the possible implementations of the third embodiment or the fourth embodiment when being called by a processor.

REFERENCE NUMBERS ARE AS FOLLOWS

Figure 1:
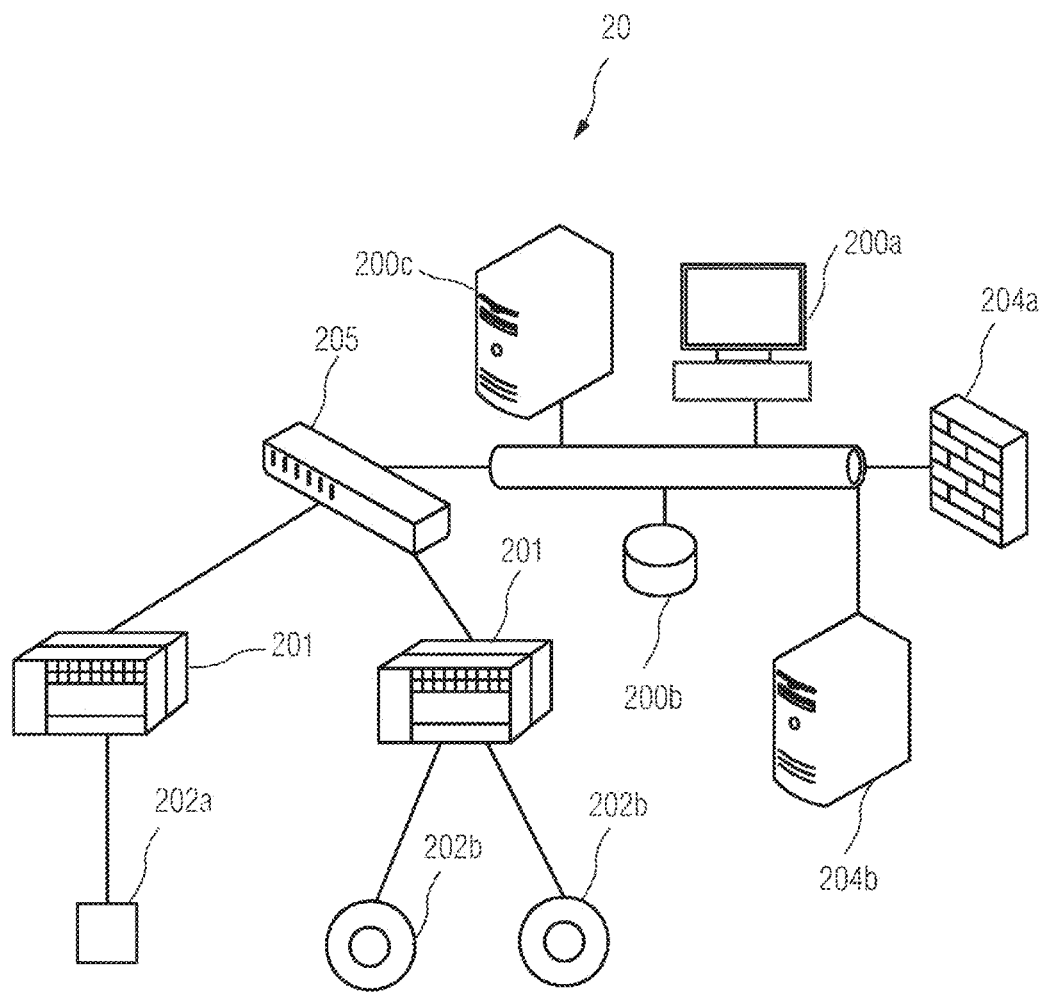
FIG. 1 is a schematic diagram of an OT system.

| Reference numbers | Meaning |
| --- | --- |
| 20 | OT system |
| 201 | Industrial controller |
| 202a | Sensor |
| 202b | Motor |
| 200a | Engineer station |
| 200b | Database server |
| 200c | Application server |
| 204a | Firewall |
| 204b | Server for intrusion detection |
| 205 | Network switching and routing device |
| 10 | Analysis device for OT system |
| 101 | Parsing module |
| 102 | Identifying module |
| 103 | Model generation module |
| 104 | Display module |
| 301-303 | Step |
| 30 | Analysis system for OT system |
| 401 | Data acquisition device |
| 402 | Data processing device |
| 403 | Storage device |
| 404 | Analysis device |
| 81a | Upper computer |
| 81b | Server |
| 81c | Field intrusion detection system |
| 81d | Security logs crawled from the Internet |
| 82 | Data acquisition processing |
| 83 | Data flow processing |
| 83a | Data preparation processing |
| 83b | Data enrichment processing |
| 83c | Flow analysis plug-in |
| 83d | Fusion and correlation processing |
| 83e | Machine learning algorithm |
| 84 | Data lake |
| 84a | Distributed file system |
| 84b | Elastic search |

-continued

| Reference numbers | Meaning |
| --- | --- |
| 84c | MongoDB |
| 84d | Graph database |
| 85 | Security analysis processing |
| 85a | Feature statistical processing |
| 85b | Situation awareness processing |
| 85c | Exploratory data analysis processing |
| 86 | Visual processing |
| 86a | Asset visualization |
| 86b | Threat visualization |
| 86c | Situation awareness dashboard |
| 86d | EDA interactive interface |
| 901-905 | Step |
| 1000 | Analysis device |
| 1001 | Processor |
| 1002 | Memory |

DETAILED DESCRIPTION OF THE EXAMPLE EMBODIMENTS

In a first embodiment, an analysis device for an OT system is provided.

A first embodiment of the analysis device for the OT system comprises:
- a parsing module configured to acquire first data related to the OT system from a data storage area, and parse out first features of the first data;
- an identifying module configured to identify an abnormal feature from the first features; and
- a model generation module configured to acquire second data related to the abnormal feature from the data storage area, and generate an algorithm model based on the second data, where the algorithm model is used for identifying an attack behavior related to the abnormal feature.

The abnormal feature is extracted from the big data related to the OT system, the detailed data related to the abnormal feature are acquired, and the algorithm model for identifying the relevant attack behavior is generated based on the detailed data. Since the algorithm model has been generated based on the abnormal feature of the attack behavior, even if the related attack behavior of the abnormal feature is a novel attack behavior, the attack behavior can still be normally identified by means of the algorithm model, thus improving the security of the OT system.

Optionally, the first data contain security logs of the OT system;
the parsing module is configured to perform at least one of the following:
parsing out the real-time trend of the security logs as the first feature;
parsing out the historical average of the security logs as the first feature;
parsing out the type distribution of the security logs as the first feature; and
parsing out a time sequence related to a predetermined industrial control application operation in the security logs as the first feature.

Therefore, multiple types of first features can be extracted based on the security logs. The real-time trend of the security logs reflects the current trend in the number of security events in the OT system. By comparing with the historical average, a large increase in the security logs can be identified, which indicates that there is an attack behavior or unsafe operation of internal personnel, or a user is reconfiguring the system to change the behavior characteristics of the OT system.

Moreover, according to the type distribution of the security logs, it can be determined whether the type of a security threat currently faced by the OT system is unpatched and vulnerable, or an abuse caused by uncontrolled user accounts, or infection by malicious software, etc., thereby making it possible to clarify the security threat faced by the OT system.

In addition, because the OT system is a highly deterministic system, once the configuration is completed (mainly pre-configuration of the communication between machines), a time sequence of the application access/operation between a human machine interface (HMI) and a field controller also shows strong determinacy and periodicity. Therefore, by monitoring whether a time sequence of an industrial control application operation deviates from the original cycle or mode, it can be determined whether an abnormal event has occurred.

Optionally, the first data contain associated data of the security logs of the OT system;
  the parsing module is configured to perform at least one of the following:
  extracting a predetermined number of security risk events from the associated data as the first feature;
  extracting security events from the associated data as the first feature; and
  extracting a behavior sequence from the associated data as the first feature, wherein the behavior sequence contains a plurality of associated security events.

Therefore, multiple types of first features can be extracted based on the associated data of the security logs. The statistics of security risk events/security events can reflect the security situation of the OT system and major threats faced by the OT system, accordingly, common/normal behavior sequences of machines/operators in the OT system are further identified on the basis of the analysis of the security logs, and using this as a baseline, an abnormal event is determined if a deviation from the baseline is identified.

Optionally, the first data contain network traffic of the OT system;
  the parsing module is configured to perform at least one of the following:
  parsing out a domain name system request within a first predetermined period in the network traffic as the first feature;
  parsing out a hypertext transfer protocol request within a second predetermined period in the network traffic as the first feature;
  parsing out a domain permission query request within a third predetermined period in the network traffic as the first feature; and
  parsing out an industrial control protocol access request within a fourth predetermined period in the network traffic as the first feature.

Therefore, multiple types of first features can be extracted based on the network traffic.

The key significance of taking the domain name system request within the predetermined period as the first feature according to the embodiment of the invention is that a large amount of malicious software is currently using a domain name system request to achieve communication between an infected host and a controlled host, therefore, whether a host in the OT system is infected by malicious software can be determined according to whether there is an abnormal domain name (such as an algorithm generated domain name).

Moreover, the key significance of taking the hypertext transfer protocol request within the predetermined period as the first feature according to the embodiment of the invention is that another common protocol for malicious software to achieve communication between the infected host and the controlled host is a hypertext transfer protocol, therefore, the security of the OT system can be improved by closely monitoring hypertext transfer protocol network traffic in the OT system.

In addition, the key significance of taking the domain permission query request as the first feature according to the embodiment of the invention is that Windows systems and domain management schemes thereof are commonly used in the OT system, and in this environment, a domain controller of the Windows domain controls all host and account information in the entire system. Therefore, many detection technologies dedicated for domain control hosts have appeared in recent years, making massive host/port/account scanning which is easily perceived unnecessary, and a large amount of information of the target OT system can be obtained simply by access to a domain control host. Therefore, in the embodiment of the invention, a domain permission query is monitored, and if it is found that a host frequently queries domain information, the behavior is deemed abnormal.

In addition, the key significance of taking the industrial control protocol access request as the first feature according to the embodiment of the invention is that since the field controller is controlled through industrial control protocol communication, in the embodiment of the invention, open protocol communication is monitored and high-risk control communication is detected, such as halt command, reset to factory defaults, etc.

Optionally, the first data contain associated data of the network traffic of the OT system;
  the parsing module is configured to perform at least one of the following:
  extracting a predetermined number of security risk events from the associated data as the first feature;
  extracting security events from the associated data as the first feature; and
  extracting a behavior sequence from the associated data as the first feature, wherein the behavior sequence contains a plurality of associated security events.

Therefore, multiple types of first features can be extracted based on the associated data of the network traffic. The statistics of security risk events/security events can reflect the security situation of the OT system and major threats faced by the OT system, accordingly, common/normal behavior sequences of machines/operators in the OT system are further identified on the basis of the analysis of the network traffic, and using this as a baseline, an abnormal event is determined if a deviation from the baseline is identified.

Optionally, the analysis device for the OT system further comprises:
  a display module configured to display the first features on a visual interface;
  wherein the identifying module is configured to identify the abnormal feature from the first features based on a first interaction instruction triggered on the visual interface; and
  the model generation module is configured to perform data mining on the abnormal feature in the data storage area to acquire the second data based on a second interaction instruction triggered on the visual interface.

Therefore, by visually displaying the first features, the abnormal feature can be identified easily based on the first interactive instruction triggered by the user on the visual interface, and data mining is performed on the abnormal feature in the data storage area based on the second interactive instruction triggered by the user on the visual interface, so as to obtain the second data.

Optionally, the model generation module is specifically configured to perform at least one of the following operations when performing data mining on the abnormal feature:
performing zooming on data associated with the abnormal feature;
performing filtration on data associated with the abnormal feature;
performing exploration and discovery on data associated with the abnormal feature; and
performing forensics analysis on data associated with the abnormal feature.

Therefore, various types of data mining methods are provided to facilitate the acquisition of detailed data related to the abnormal feature.

Optionally, the model generation module is specifically configured to perform the following when generating the algorithm model based on the second data:
determining a first statistical feature of an abnormal security event related to the abnormal feature;
determining a second statistical feature of an abnormal security behavior related to the abnormal feature;
determining fingerprints of an attack behavior related to the abnormal feature;
determining, based on an artificial customization method, an artificial customization algorithm for detecting the abnormal security event related to the abnormal feature;
determining, based on a machine learning method, a classification and identification algorithm for detecting the abnormal security event related to the abnormal feature; and
generating the algorithm model by aggregating the first statistical feature, the second statistical feature, the fingerprints, the artificial customization algorithm, and the classification and identification algorithm.

Therefore, complementation of the advantages of human intelligence and the advantages of artificial intelligence can be realized by aggregating the artificial customization algorithm and the classification and identification algorithm as well as the relevant features and fingerprints, even if the related attack behavior of the abnormal feature is a novel attack behavior, the attack behavior can still be normally identified by means of the aggregated algorithm model, thus improving the intrusion detection capacity.

In a second embodiment, an analysis system for an OT system is provided.

The analysis system comprises:
a data acquisition device configured to collect original data of the OT system;
a data processing device configured to perform data preparation on the original data, perform post-processing on the data after data preparation, and perform real-time anomaly detection on the data after data preparation and the data after post-processing according to a machine learning algorithm;
a storage device configured to provide first data related to the OT system, wherein the first data comprise the original data, the data after data preparation, and the post-processed data; and
an analysis device configured to acquire the first data related to the OT system, parse out first features of the first data, identify an abnormal feature from the first features, acquire second data related to the abnormal feature from the storage device, generate an algorithm model based on the second data, and send the algorithm model to the data processing device, where the algorithm model is used for identifying an attack behavior related to the abnormal feature;
wherein the data processing device is further configured to update the machine learning algorithm based on the algorithm model.

The data acquisition device collects the original data, the data processing device performs data preparation and post-processing on the data, the storage device stores the first data, and the analysis device identifies the abnormal feature, acquires detailed data related to the abnormal feature, and generates the algorithm model for identifying the related attack behavior based on the detailed data. Therefore, even if the related attack behavior of the abnormal feature is a novel attack behavior, the attack behavior can still be normally identified by means of the analysis system, thus improving the security of the OT system.

Optionally, the first data contain security logs of the OT system;
the analysis device is configured to perform at least one of the following:
parsing out the real-time trend of the security logs as the first feature;
parsing out the historical average of the security logs as the first feature;
parsing out the type distribution of the security logs as the first feature; and
parsing out a time sequence related to a predetermined industrial control application operation in the security logs as the first feature.

Therefore, multiple types of first features can be extracted based on the security logs.

Preferably, the first data contain associated data of the security logs of the OT system;
the analysis device is configured to perform at least one of the following:
extracting a predetermined number of security risk events from the associated data as the first feature;
extracting security events from the associated data as the first feature; and
extracting a behavior sequence from the associated data as the first feature, wherein the behavior sequence contains a plurality of associated security events.

Therefore, multiple types of first features can be extracted based on the associated data of the security logs.

Preferably, the first data contain network traffic of the OT system;
the analysis device is configured to perform at least one of the following:
parsing out a domain name system request within a first predetermined period in the network traffic as the first feature;
parsing out a hypertext transfer protocol request within a second predetermined period in the network traffic as the first feature;

parsing out a domain permission query request within a third predetermined period in the network traffic as the first feature; and parsing out an industrial control protocol access request within a fourth predetermined period in the network traffic as the first feature.

Therefore, multiple types of first features can be extracted based on the network traffic.

Preferably, the first data contain associated data of the network traffic of the OT system;

the analysis device is configured to perform at least one of the following:

extracting a predetermined number of security risk events from the associated data as the first feature;

extracting security events from the associated data as the first feature; and extracting a behavior sequence from the associated data as the first feature, wherein the behavior sequence contains a plurality of associated security events.

Therefore, multiple types of first features can be extracted based on the associated data of the network traffic. Preferably, the analysis device is also configured to display the first features on a visual interface, wherein the identification of the abnormal feature from the first features comprises: identifying the abnormal feature from the first features based on an interaction instruction triggered on the visual interface; and the acquisition of the second data related to the abnormal feature from the storage device comprises: performing data mining on the abnormal feature in the storage device to obtain the second data based on a second interaction instruction triggered on the visual interface.

Therefore, by visually displaying the first features, the abnormal feature can be identified easily based on the first interactive instruction triggered by the user on the visual interface, and data mining is performed on the abnormal feature in the data storage area based on the second interactive instruction triggered by the user on the visual interface, so as to obtain the second data.

Preferably, the analysis device is configured to perform at least one of the following:

performing zooming on data associated with the abnormal feature;

performing filtration on data associated with the abnormal feature;

performing exploration and discovery on data associated with the abnormal feature; and performing forensics analysis on data associated with the abnormal feature.

Therefore, various types of data mining methods are provided to facilitate the acquisition of detailed data related to the abnormal feature.

Preferably, the analysis device is configured to determine a first statistical feature of an abnormal security event related to the abnormal feature; determine a second statistical feature of an abnormal security behavior related to the abnormal feature; determine fingerprints of an attack behavior related to the abnormal feature; determine, based on an artificial customization method, an artificial customization algorithm for detecting the abnormal security event related to the abnormal feature; determine, based on a machine learning method, a classification and identification algorithm for detecting the abnormal security event related to the abnormal feature; and generate the algorithm model by aggregating the first statistical feature, the second statistical feature, the fingerprints, the artificial customization algorithm, and the classification and identification algorithm.

Therefore, complementation of the advantages of human intelligence and the advantages of artificial intelligence can be realized by aggregating the artificial customization algorithm and the classification and identification algorithm as well as the relevant features and fingerprints, even if the related attack behavior of the abnormal feature is a novel attack behavior, the attack behavior can still be normally identified by means of the aggregated algorithm model, thus improving the intrusion detection capacity.

Preferably, the data acquisition device comprises at least one network sensor arranged in the OT system for acquiring at least one original datum transmitted in the OT system;

the original data include at least one of the following:

host security logs collected from a human machine interface, a workstation or an OT environment server;

security logs collected from anti-virus software or a data leakage protection agent;

security logs collected from an industrial network device;

security logs collected from an industrial network security product;

network traffic collected from an industrial network;

threat intelligence collected from a commercial threat intelligence source code or an open source threat intelligence source;

audit data associated with security events collected from OT equipment; and data collected from a third party.

Therefore, by implementing the data acquisition device as at least one network sensor arranged in the OT system, a variety of original data in the OT system can be acquired.

Preferably, the storage device comprises at least one of the following:

a distributed file system for storing unstructured first data;

a search-oriented database for storing structured first data;

a file database for storing first data with a complex structure; and a graph database for storing first data which is of a graph structure consisting of nodes and sides for connecting the nodes.

Therefore, the storage device can be implemented in various ways and can store multiple types of first data.

In a third embodiment, an analysis method for an OT system is provided. The method comprises:

acquiring first data related to the OT system from a data storage area, and parsing out first features of the first data;

identifying an abnormal feature from the first features; and acquiring second data related to the abnormal feature from the data storage area, and generating an algorithm model based on the second data, where the algorithm model is used for identifying an attack behavior related to the abnormal feature.

The abnormal feature is extracted from the big data related to the OT system, the detailed data related to the abnormal feature are acquired, and the algorithm model for identifying the related attack behavior is generated based on the detailed data, even if the related attack behavior of the abnormal feature is a novel attack behavior, the attack behavior can still be normally identified by means of the algorithm model, thus improving the security of the OT system.

Optionally, the first data contain security logs of the OT system;

the parsing of the first features of the first data comprises at least one of the following:

parsing out the real-time trend of the security logs as the first feature;
parsing out the historical average of the security logs as the first feature;
parsing out the type distribution of the security logs as the first feature; and
parsing out a time sequence related to a predetermined industrial control application operation in the security logs as the first feature.

Therefore, multiple types of first features can be extracted based on the associated data of the security logs.

Preferably, the first data contain associated data of the security logs of the OT system;
the parsing of the first features of the first data comprises at least one of the following:
extracting a predetermined number of security risk events from the associated data as the first feature;
extracting security events from the associated data as the first feature; and
parsing out an industrial control protocol access request within a fourth predetermined period in the network traffic as the first feature.
extracting a behavior sequence from the associated data as the first feature, wherein the behavior sequence contains a plurality of associated security events.

Therefore, multiple types of first features can be extracted based on the associated data of the security logs.

Preferably, the first data contain network traffic of the OT system;
the parsing of the first features of the first data comprises at least one of the following:
parsing out a domain name system request within a first predetermined period in the network traffic as the first feature;
parsing out a hypertext transfer protocol request within a second predetermined period in the network traffic as the first feature;
parsing out a domain permission query request within a third predetermined period in the network traffic as the first feature; and
parsing out an industrial control protocol access request within a fourth predetermined period in the network traffic as the first feature.

Therefore, multiple types of first features can be extracted based on the network traffic.

Preferably, the first data contain associated data of the network traffic of the OT system;
the parsing of the first features of the first data comprises at least one of the following:
extracting a predetermined number of security risk events from the associated data as the first feature;
extracting security events from the associated data as the first feature; and
extracting a behavior sequence from the associated data as the first feature, wherein the behavior sequence contains a plurality of associated security events.

Therefore, multiple types of first features can be extracted based on the associated data of the network traffic.

Preferably, the method further comprises: displaying the first features on a visual interface;
the identification of the abnormal feature from the first features comprises: identifying the abnormal feature from the first features based on an interaction instruction triggered on the visual interface; and the acquisition of the second data related to the abnormal feature from the data storage area comprises: performing data mining on the abnormal feature in the data storage area to obtain the second data based on a second interaction instruction triggered on the visual interface.

Therefore, by visually displaying the first features, the abnormal feature can be identified easily based on the first interactive instruction triggered by the user on the visual interface, and data mining is performed on the abnormal feature in the data storage area based on the second interactive instruction triggered by the user on the visual interface, so as to obtain the second data.

Preferably, data mining of the abnormal feature comprises at least one of the following:
performing zooming on data associated with the abnormal feature;
performing filtration on data associated with the abnormal feature;
performing exploration and discovery on data associated with the abnormal feature; and
performing forensics analysis on data associated with the abnormal feature.

Therefore, various types of data mining methods are provided to facilitate the acquisition of detailed data related to the abnormal feature.

Preferably, the generation of the algorithm model based on the second data comprises:
determining a first statistical feature of an abnormal security event related to the abnormal feature;
determining a second statistical feature of an abnormal security behavior related to the abnormal feature;
determining fingerprints of an attack behavior related to the abnormal feature;
determining, based on an artificial customization method, an artificial customization algorithm for detecting the abnormal security event related to the abnormal feature;
determining, based on a machine learning method, a classification and identification algorithm for detecting the abnormal security event related to the abnormal feature; and
generating the algorithm model by aggregating the first statistical feature, the second statistical feature, the fingerprints, the artificial customization algorithm, and the classification and identification algorithm.

Therefore, complementation of the advantages of human intelligence and the advantages of artificial intelligence can be realized by aggregating the artificial customization algorithm and the classification and identification algorithm as well as the relevant features and fingerprints, even if the related attack behavior of the abnormal feature is a novel attack behavior, the attack behavior can still be normally identified by means of the aggregated algorithm model, thus improving the intrusion detection capacity.

In a fourth embodiment, an analysis method for an OT system is provided, comprising:
collecting original data of the OT system;
performing data preparation on the original data, performing real-time anomaly detection on the data after data preparation according to a machine learning algorithm, and performing post-processing on the data after data preparation;
providing first data related to the OT system, wherein the first data comprise the original data, the data after data preparation, and the post-processed data;
acquiring the first data related to the OT system, parsing out first features of the first data, identifying an abnormal feature from the first features, acquiring second data related to the abnormal feature from the data storage area, and generating an algorithm model based on the second data, wherein the algorithm model is used for identifying an attack behavior related to the abnormal feature; and updating the machine learning algorithm based on the algorithm model.

Therefore, the abnormal feature is identified, the detailed data related to the abnormal feature are acquired, and the algorithm model for identifying the related attack behavior is generated based on the detailed data, even if the related attack behavior of the abnormal feature is a novel attack behavior, the related attack behavior can still be normally identified by means of the algorithm model, thus improving the security of the OT system.

In a fifth embodiment, an analysis device for an OT system is provided. The device comprises a processor and a memory, and an application executable by the processor is stored in the memory for causing the processor to perform the analysis method for the OT system according to any one of the embodiments.

In a sixth embodiment, a computer-readable storage medium is provided, and computer-readable instructions are stored therein for performing the analysis method for the OT system according to any one of the embodiments.

In a seventh embodiment, a machine-readable medium is provided, and machine-readable instructions are stored thereon for performing the method provided by any one of the possible implementations of the third embodiment or the fourth embodiment when being called by a processor.

In order to make the technical solutions and advantages of the invention clearer, the invention is further described in detail below with reference to the accompanying drawings and embodiments. It should be understood that the specific embodiments described herein are only used to illustrate the invention and are not configured to limit the protection scope of the invention.

For brevity and clarity of description, the solution of the invention is described below by describing several representative embodiments. The numerous details in the embodiments are merely configured to help to understand the solution of the invention. However, it is obvious that the technical solution of the invention may not be limited to these details during implementation. In order to avoid unnecessarily obscuring the solution of the invention, some embodiments are not described in detail, but only a framework is given. Hereinafter, "comprise" means "comprise but not limited to", and "based on" means "based at least on . . . but not limited to just based on . . . ". Due to the language habits of Chinese, when the number of a component is not specified hereinafter, it means that the number of the component can be one or more, or it can be understood as at least one.

The applicant found that there are many fundamental differences between IT systems and OT systems.

For example, these differences at least include: (1) OT systems usually need to control a physical process in a critical environment and have strong requirements for the safety and protection of the process; (2) the service life of OT systems can be up to 15 to 20 years; (3) OT systems require high availability, integrity and confidentiality; (4) OT systems have highly deterministic systems and networks; (5) OT systems often have real-time applications, response is closely related to time, and high latency and/or jitter is unacceptable; (6) data in OT systems are usually of a simple type with a high data rate, and immediate analysis is required; (7) the network in OT systems usually consists of a human-machine interface (HMI), a sensor, an input/output interface (TO), a dedicated controller (for example, PLC, RTU, etc.), a code display, a touch screen, etc.; (8) it is difficult to schedule patch restart in OT systems, and patch restart has a negative effect.

Considering the environmental characteristics of OT systems which are distinct from IT systems, a security analysis method for IT systems can hardly suit OT systems. Moreover, as security threats become more complex and dynamic, especially the complexity and variability of OT systems increase the difficulty of security monitoring of OT systems, traditional security methods (such as antivirus, IDS, firewall and STEM) are no longer suitable for the current OT environment.

In particular, the huge difference between the security field and other fields is that behind attacks, creative humans are committed to finding new ways to disrupt OT systems. In this case, if a static method or a static algorithm which is only used to identify known attack means is deployed in OT systems (even if they are based on artificial intelligence), it is difficult to handle novel and endless attack methods.

The embodiment of the invention provides a security analysis technical solution for an OT system to realize intelligent security analysis based on big data. In the embodiment of the invention, an abnormal feature can be extracted from big data related to the OT system, and detailed data related to the abnormal feature can be obtained, and an algorithm model for identifying a relevant attack behavior can be generated based on the detailed data. Even if the relevant attack behavior of the abnormal feature is a novel attack behavior, the attack behavior can still be normally identified by means of the algorithm model.

Compared with IT systems (mainly human-to-human communication), OT systems (mainly machine-to-machine communication) exhibit a high degree of determinacy. In response to this characteristic, the embodiment of the invention adopts a predefined statistical method or correlation analysis method to extract a normal behavior model or security situation of the OT system from the monitoring data of the OT system, and then the normal behavior model or security situation of the OT system is displayed to security analysts in a visual mode on a visual interface such as a situation awareness dashboard. When an abnormal behavior occurs in the OT system, the abnormal behavior will change the above normal behavior model or security posture in a certain way, so as to be shown on the situation awareness dashboard. At this point, security analysts can extract the feature of the abnormal behavior based on various data mining methods. The feature can be manifested as: fingerprints of a specific log, message or file; a specific behavior feature (a series of specific security events); a specific algorithm (hand-coded) which can identify abnormal behaviors; a machine learning classifier obtained after calculating normal and abnormal data by machine learning, and so on. Then a new model file for identifying the abnormal behavior is generated based on the above-described feature, algorithm, and machine learning classifier. Therefore, the embodiment of the invention not only can perform anomaly detection based on a normal behavior pattern of the OT system, but also has increasingly stronger intrusion detection capability through integration with the human intelligence of security analysts.

In order to make the invention easier to understand, some of the descriptions involved in the OT system and the embodiment of the invention are explained below. It should be noted that these explanations should not be construed as limiting the scope of the invention as claimed.

OT System

OT utilizes hardware and software to achieve detection or control by directly monitoring and/or controlling physical devices, processes and events in an enterprise. An OT system uses a computer to monitor or change the physical state of a system.

Examples of an OT system include: supervisory control and data acquisition (SCADA) system, distributed control system (DCS), computer numerical control (CNC) system (including computerized mechanical tools), and scientific equipment (such as digital oscilloscopes).

FIG. 1 is a schematic diagram of an OT system. As shown in FIG. 1, the OT system 20 may comprise:

- at least one industrial controller 201, wherein the industrial controller 201 may comprise, but is not limited to, a programmable logic controller (PLC), and a programmable automation controller (PAC);
- at least one field device, such as a sensor 202a, and a motor 202b, wherein the sensor 202a may obtain field data such as temperature, humidity, pressure and liquid flow rate under the control of the industrial controller 201, and the motor 202b can drive motion under the control of the industrial controller 201;
- at least one industrial host, such as an engineer station (ES) 200a, an operator station (OS), a human machine interface (HMI), a database server 200b, and an application server 200c;
- at least one security device, such as a firewall 204a, and a server 204b for intrusion detection, wherein the security fire-protection device such as the firewall 204a and the server 204b for intrusion detection may also form an intrusion detection system (IDS) to implement intrusion detection of the OT system 20; and
- at least one network switching and routing device 205, such as an industrial switch and an industrial router, wherein these network switching and routing devices 205 may constitute an industrial Ethernet to interconnect the internal devices of the OT system 20.

A typical architecture of the OT system is described above as an example. Those skilled in the art may realize that the architecture of the OT system may be changed based on a specific application environment or deployment difference, and the embodiment of the invention is not limited hereto.

Figure 2:
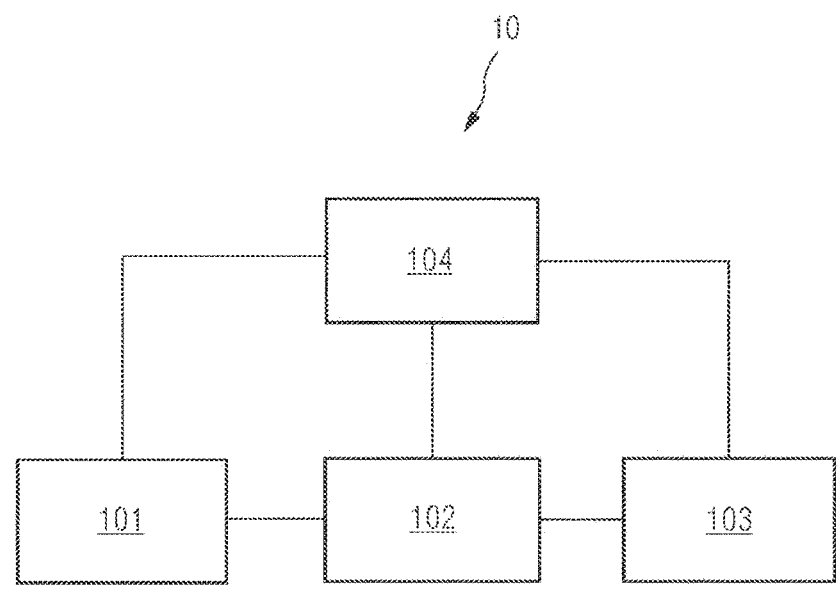
FIG. 2 is a structure diagram of an analysis device for an OT system according to an embodiment of the invention.

FIG. 2 is a structure diagram of an analysis device for an OT system according to an embodiment of the invention.

As shown in FIG. 2, the analysis device 10 comprises:

- a parsing module 101 configured to acquire first data related to the OT system from a data storage area, and parse out first features of the first data;
- an identifying module 102 configured to identify an abnormal feature from the first features; and
- a model generation module 103 configured to acquire second data related to the abnormal feature from the data storage area, and generate an algorithm model based on the second data, where the algorithm model is used for identifying an attack behavior related to the abnormal feature.

The first data include monitoring data of the OT system. For example, the first data may include security logs of the OT system, associated data of the security logs of the OT system, network traffic of the OT system, associated data of the network traffic of the OT system, and the like.

In one embodiment, the first data include the security logs of the OT system.

For example, these security logs may include at least one of the following:

(1) host security logs collected from an HMI, a workstation or an OT environment server such as a database server and an application server;
(2) security logs collected from anti-virus software or a data leakage protection (DLP) agent;
(3) security logs (such as SNMP) collected from an industrial network device (such as a switcher and a router);
(4) security logs collected from an industrial network security product (such as a firewall and IDS/IPS).

Typical examples of the security logs are described above exemplarily, and those skilled in the art can appreciate that the description is only example and is not intended to limit the protection scope of the embodiment of the invention.

After obtaining the security logs from the data storage area, the parsing module 101 parses out first features of the security logs. The first features of the security logs represent the statistical characteristics of the security logs. By presenting the first features to the user, the user can find an anomaly based on his own knowledge.

Preferably, the parsing module 101 parses out the time trend of the security logs as the first feature. For example, the parsing module 101 parses out the real-time time trend of the network traffic from the security logs, and takes the real-time time trend of the network traffic as the first feature. For another example, the parsing module 101 parses out the historical time trend of the network traffic from the security logs, and takes the historical time trend of the network traffic as the first feature.

Preferably, the parsing module 101 parses out the history average of the security logs as the first feature. For example, the parsing module 101 parses out the average of the network traffic within a predetermined period from the security logs, and takes the average as the first feature.

Preferably, the parsing module 101 parses out the type distribution of the security logs as the first feature. For example, the parsing module 101 parses out the number of the security logs provided by the industrial network device and the number of the security logs provided by the industrial network security product, and takes the proportional distribution between the two as the first feature. For another example, the parsing module 101 parses out the number of the host security logs provided by the OT environment server and the number of the security logs provided by the industrial network security product, and takes the proportional distribution between the two as the first feature.

Preferably, the parsing module 101 parses out a time sequence related to a predetermined industrial control application operation in the security logs as the first feature. The time sequence of the predetermined industrial control application operation is a time sequence of a security-related key industrial control application operation. For example, the parsing module 101 parses out a log sequence concerning the uploading and downloading of control programs by an industrial control application to a field controller such as a PLC in the security logs, and takes the log sequence as the first feature.

The specific manners for determining the first features based on the network logs are described above, and those skilled in the art may realize that such description is only example, and the embodiment of the invention is not limited hereto.

In one embodiment, the first data contain network traffic of the OT system, for example, the network traffic of a NetFlow tool or Full Packet Capture tool from an industrial network. NetFlow extracts summary information about a session from the original network traffic (equivalent to the content of full data packet capture). For example, NetFlow of IP data packets defines at least the following seven key elements: source IP address; destination IP address; source port number; destination port number; the type of Layer 3 protocol; TOS field; logical port of input/output of network device (if index); and so on.

After obtaining the network traffic from the data storage area, the parsing module 101 parses out first features of the network traffic. The first features of the network traffic represent the statistical characteristics of the network traffic. By presenting the first features to the user, the user can identify whether there is an anomaly based on his own knowledge.

Preferably, the parsing module 101 parses out a domain name system (DNS) request within a first predetermined period in the network traffic as the first feature. Preferably, the parsing module 101 parses out a hypertext transfer protocol (HTTP) request within a second predetermined period in the network traffic as the first feature. Preferably, the parsing module 101 parses out a domain permission query request within a third predetermined period in the network traffic as the first feature. Preferably, the parsing module 101 parses out an industrial control protocol access request (such as critical shutdown, restart instructions) in a fourth predetermined period in the network traffic as the first feature. The first predetermined period, the second predetermined period, the third predetermined period and the fourth predetermined period may be the same period, and may also be different periods.

The specific manners for determining the first features based on the network traffic are described above, and those skilled in the art may realize that such description is only example, and the embodiment of the invention is not limited hereto.

In one embodiment, the first data contain associated data of the security logs of the OT system.

The associated data of the security logs herein refer to comprehensive log information obtained by analyzing and integrating the security logs from different data sources. For example, during a malicious IP intrusion activity, digital traces may be left in firewalls, WAFs, routers/switches, IDSs and upper computers (in the form of security logs). By identifying the correlation between the security logs, a large number of heterogeneous security logs can be fused and correlated into a series of security events or behavior sequences, and these security events or behavior sequences are the associated data of the security logs.

Preferably, the associated data may also contain data generated by fusing and correlating the security logs with other types of data (such as full packet network traffic, NetFlow).

After obtaining the associated data from the data storage area, the parsing module 101 parses out the first features of the associated data. The first features of the associated data represent the statistical characteristics of the associated data. By presenting the first features to the user, the user can find an anomaly based on his own knowledge.

Preferably, the parsing module 101 extracts a predetermined number of security risk events from the associated data as the first feature. For example, the parsing module 101 may extract five highest-level security risk events from the associated data, and take the five highest-level security risk events as the first feature.

Preferably, the parsing module 101 extracts security events from the associated data as the first feature. For example, the parsing module 101 can extract all on-off events and network scanning events within 24 hours from the associated data, and take all the on-off events and network scanning events within 24 hours as the first feature.

Preferably, the parsing module 101 extracts security events from the associated data as the first feature. For example, the parsing module 101 can extract all the key security events such as field controller shutdown, restart and configuration download from the associated data, and take all the shutdown, restart and configuration download events as the first feature.

Preferably, the parsing module 101 extracts a behavior sequence from the associated data as the first feature, wherein the behavior sequence contains a plurality of associated security events. For example, the parsing module 101 extracts a behavior sequence including a booting event, a network scanning event, and a resource download event from the associated data, and takes the behavior sequence as the first feature.

In one embodiment, the first data contain associated data of the network traffic of the OT system.

The associated data of the network traffic herein refer to comprehensive network traffic information obtained by analyzing and integrating the network traffic from different data sources.

After obtaining the associated data of the network traffic from the data storage area, the parsing module 101 parses out first features of the associated data. The first features of the associated data represent the statistical characteristics of the associated data. By presenting the first features to the user, the user can identify whether there is an anomaly based on his own knowledge.

Preferably, the parsing module 101 extracts a predetermined number of security risk events from the associated data as the first feature. For example, the parsing module 101 may extract five highest-level risks including DNS exception requesting, downloading files from a public network, network scanning, password blasting, and vulnerability exploitation from the associated data, and take the five highest-level risks as the first feature.

Preferably, the parsing module 101 extracts security events from the associated data as the first feature. For example, the parsing module 101 can extract all on-off events and network scanning events within 24 hours from the associated data, and take all the on-off events and network scanning events within 24 hours as the first feature.

Preferably, the parsing module 101 extracts a behavior sequence from the associated data as the first feature, wherein the behavior sequence contains a plurality of associated security events. For example, the parsing module 101 extracts a behavior sequence including a booting event, a network scanning event, a password blasting event, a vulnerability exploitation event and a resource download event from the associated data, and takes the behavior sequence as the first feature.

The specific manners for determining the first features based on the associated data are described above, and those skilled in the art may realize that such description is only example, and the embodiment of the invention is not limited hereto.

Preferably, the associated data may also contain data generated by fusing and correlating the security logs with other types of data (such as full packet network traffic, NetFlow).

The specific manners for determining the first features based on the associated data are described above, and those skilled in the art may realize that such description is only example, and the embodiment of the invention is not limited hereto.

After determining the first features based on the above description, the identifying module 102 identifies the abnormal feature from the first features. The first features can be displayed to the user via various visual interfaces herein, and the user finds the abnormal feature based on his own knowledge. Optionally, a predetermined criterion may be stored in the identifying module 102, and the identifying module 102 automatically determines the abnormal feature by matching the first features with the criterion.

In one embodiment, the device further comprises:
a display module 104 configured to display the first features on a visual interface; and an identifying module 102 configured to identify the abnormal feature from the first features based on a first interaction instruction triggered on the visual interface. Preferably, the first interaction instruction may be implemented as a selection instruction.

For example, the display module 104 may display the first features by using a visual graph such as a time trend graph, a TreeMap graph, a Top security risk event graph, or a Sankey graph. The user triggers the selection instruction on the visual interface to identify the abnormal feature from the first features.

For example, the display module 104 displays the following first features by means of graphs: (1) the historical time trend of network traffic within 24 hours; (2) the ratio of the number of the security logs provided by the industrial network device to the number of the security logs provided by the industrial network security product; (3) the ratio of the number of the host security logs provided by the OT environment server to the number of the security logs provided by the industrial network security product; and (4) all on-off events.

The user browses the graphs and finds that there is a peak in network traffic between 2 am and 3 am. According to his own experience and knowledge, the user can determine that feature (1) is an abnormal feature and trigger the selection instruction on the visual interface to select feature (1) as the abnormal feature.

After determining the abnormal feature, the model generation module 103 obtains second data related to the abnormal feature from the data storage area based on a second interaction instruction triggered on the visual interface, and generates an algorithm model based on the second data. The algorithm model is used to identify an attack behavior related to the abnormal feature. Moreover, the second data are detailed data related to the abnormal feature. Preferably, the second interaction instruction may be implemented as: a data zooming instruction, a data filtration instruction, a data exploration and discovery instruction, a data forensics instruction, and the like.

Preferably, data mining performed by the model generation module 103 on the abnormal feature comprises at least one of the following:
(1) performing zooming on data related to the abnormal feature based on the data zooming instruction;
(2) performing filtration on data related to the abnormal feature based on the data filtration instruction;
(3) performing exploration and discovery on data related to the abnormal feature based on the data exploration and discovery instruction; and
(4) performing forensics analysis on data related to the abnormal feature based on the data forensics instruction;

For example, the model generation module 103 may use exploratory data analysis (EDA) to explore and discover detailed data related to the abnormal feature from the data storage area, and use the digital forensic technology for forensics of the detailed data and take the analysis result as the second data.

A typical process of the display module 104 displaying the first features, the identifying module 102 identifying the abnormal feature from the first features, and the model generation module 103 acquiring the second data is described below.

First, the display module 104 displays an overview or overall situation of the OT system to the user through a visual dashboard and highlights the first features in the dashboard in the form of visual graphs. The user performs zooming and filtration on the first features on the dashboard to view details, and triggers the selection instruction to determine the first feature with anomalies as the abnormal feature in the dashboard. The model generation module extracts detailed data related to the abnormal feature from the data storage area using the digital forensic technology based on the data forensics instruction triggered by the user, and takes the detailed data as the second data.

The process of the model generation module 103 generating the algorithm model for identifying the attack behavior related to the abnormal feature based on the second data is described below.

First, the model generation module 103 determines the following features based on the second data:
(1) a statistical feature of an abnormal security event or attack behavior corresponding to the abnormal feature;
(2) an indicator of compromise (IOC) represented by an abuse and attack behavior corresponding to the abnormal feature;
(3) fingerprints of the attack behavior corresponding to the abnormal feature (scanning, vulnerability exploitation, etc.);
(4) an artificial customization algorithm for detecting the abnormal security event related to the abnormal feature, such as an artificial customization algorithm for accurately detecting the abnormal behavior from related data such as the security logs; and
(5) a classification and identification algorithm for detecting the abnormal security event related to the abnormal feature, such as a classification and identification algorithm which is obtained through training and can identify the abnormal behavior from relevant data such as the security logs based on a machine learning method.

The model generation module 103 then aggregates the above-described statistical feature, fingerprints, artificial customization algorithm, and classification and identification algorithm to generate the algorithm model for identifying the attack behavior related to the abnormal feature. The algorithm model contains the statistical feature and the fingerprints of the attack behavior determined based on the detailed data of the abnormal feature. Therefore, even if the related attack behavior of the abnormal feature is a novel attack behavior, the attack behavior can still be normally identified by means of the algorithm model.

Based on the above description, the embodiment of the invention also provides an analysis method for an OT system.

Figure 3:
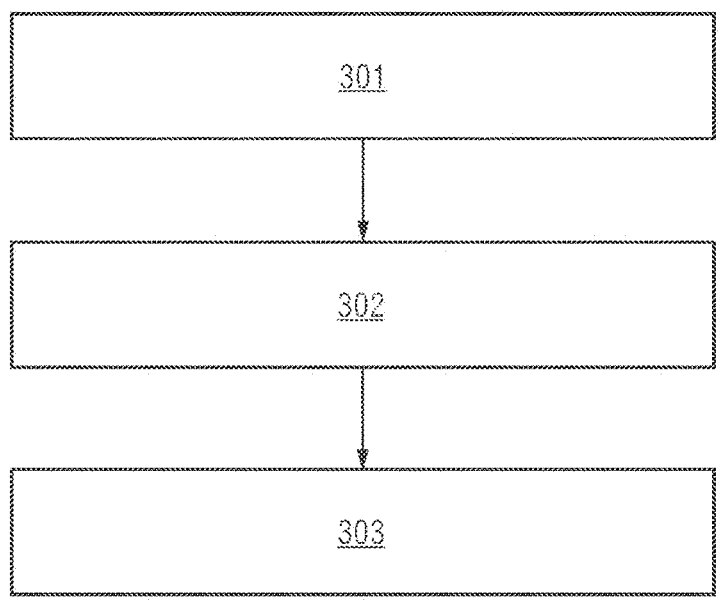
FIG. 3 is a flow chart of an analysis method for an OT system according to an embodiment of the invention.

FIG. 3 is a flow chart of an analysis method for an OT system according to an embodiment of the invention.

As shown in FIG. 3, the method comprises:
- step 301: acquiring first data related to the OT system from a data storage area, and parsing out first features of the first data;
- step 302: identifying an abnormal feature from the first features; and
- step 303: acquiring second data related to the abnormal feature from the data storage area, and generating an algorithm model based on the second data, where the algorithm model is used for identifying an attack behavior related to the abnormal feature.

In one embodiment, the first data contain the security logs of the OT system. The parsing of the first features of the first data in step 301 comprises at least one of the following: parsing out the real-time trend of the security logs as the first feature; parsing out the historical average of the security logs as the first feature; parsing out the type distribution of the security logs as the first feature; and parsing out a time sequence related to a predetermined industrial control application operation in the security logs as the first feature. The time sequence of the predetermined industrial control application operation is a time sequence of a security-related key industrial control application operation.

In one embodiment, the first data contain associated data of the security logs of the OT system. The parsing of the first features of the first data in step 301 comprises at least one of the following: extracting a predetermined number of security risk events from the associated data as the first feature; extracting security events from the associated data as the first feature; and extracting a behavior sequence from the associated data as the first feature, wherein the behavior sequence contains a plurality of associated security events.

In one embodiment, the first data contain network traffic of the OT system. The parsing of the first features of the first data in step 301 comprises at least one of the following: parsing out a domain name system request within a first predetermined period in the network traffic as the first feature; parsing out a hypertext transfer protocol request within a second predetermined period in the network traffic as the first feature; parsing out a domain permission query request within a third predetermined period in the network traffic as the first feature; and parsing out an industrial control protocol access request within a fourth predetermined period in the network traffic as the first feature.

In one embodiment, the first data contain associated data of the network traffic of the OT system. The parsing of the first features of the first data in step 301 comprises at least one of the following: extracting a predetermined number of security risk events from the associated data as the first feature; extracting security events from the associated data as the first feature; and extracting a behavior sequence from the associated data as the first feature, wherein the behavior sequence contains a plurality of associated security events.

In one embodiment, the method further comprises: displaying the first features on a visual interface. The identification of the abnormal feature from the first features in step 302 comprises: identifying the abnormal feature from the first features based on an interaction instruction triggered on the visual interface; and the acquisition of the second data related to the abnormal feature from the data storage area in step 303 comprises: performing data mining on the abnormal feature in the data storage area to obtain the second data based on a second interaction instruction triggered on the visual interface.

Preferably, data mining of the abnormal feature comprises at least one of the following: performing zooming on data associated with the abnormal feature; performing filtration on data associated with the abnormal feature; performing exploration and discovery on data associated with the abnormal feature; and performing forensics of data associated with the abnormal feature.

In one embodiment, the generation of the algorithm model based on the second data in step 303 comprises: determining a first statistical feature of an abnormal security event related to the abnormal feature; determining a second statistical feature of an abnormal security behavior related to the abnormal feature; determining fingerprints of an attack behavior related to the abnormal feature; determining, based on an artificial customization method, an artificial customization algorithm for detecting the abnormal security event related to the abnormal feature; determining, based on a machine learning method, a classification and identification algorithm for detecting the abnormal security event related to the abnormal feature; and generating the algorithm model by aggregating the first statistical feature, the second statistical feature, the fingerprints, the artificial customization algorithm, and the classification and identification algorithm.

Based on the above description, the embodiment of the invention also provides an analysis system for an OT system.

Figure 4:
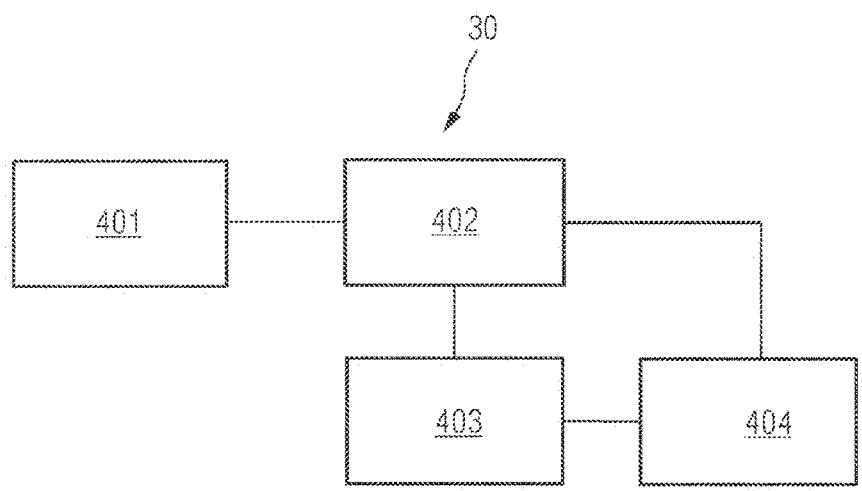
FIG. 4 is a structure diagram of an analysis system for an OT system according to an embodiment of the invention.

FIG. 4 is a structure diagram of an analysis system for an OT system according to an embodiment of the invention.

As shown in FIG. 4, the analysis system 30 comprises:
- a data acquisition device 401 configured to collect the original data of the OT system;
- a data processing device 402 configured to perform data preparation on the original data, perform post-processing on the data after data preparation, and perform real-time anomaly detection on the data after data preparation and the data after post-processing according to a machine learning algorithm;
- a storage device 403 configured to provide first data related to the OT system, wherein the first data comprise the original data, the data after data preparation, and the post-processed data; and
- an analysis device 404 configured to acquire the first data related to the OT system, parse out first features of the first data, identify an abnormal feature from the first features, acquire second data related to the abnormal feature from the storage device, generate an algorithm model based on the second data, and send the algorithm model to the data processing device, where the algorithm model is used for identifying an attack behavior related to the abnormal feature;
- wherein the data processing device 402 is further configured to update the machine learning algorithm based on the algorithm model.

In one embodiment, the data acquisition device 401 comprises at least one network sensor arranged in the OT system for acquiring at least one original datum transmitted in the OT system.

Classified by data source, the original data can be implemented as:
(1) host security logs collected from a human machine interface, a workstation or an OT environment server;
(2) security logs collected from anti-virus software or a data leakage protection agent;
(3) security logs collected from an industrial network device;
(4) security logs collected from an industrial network security product;
(5) network traffic collected from an industrial network;

(6) threat intelligence collected from a commercial source code or an open source code;
(7) forensic data associated with security events collected from OT equipment; and
(8) data collected from a third party.

Classified by data format, the original data can be implemented as structured data and unstructured data. For example, structured data include security logs, NetFlow and threat intelligence. Unstructured data include PCAP (FPC), files, images and crawled data (in most cases, web pages).

The data processing device 402 also performs data preparation on the original data. Data preparation is often used for processing confusing, inconsistent or non-standard data, attempting to combine data from multiple sources and process data obtained from unstructured sources. For the original data (especially unstructured data) collected from the OT environment, the data processing device needs to perform data preparation in terms of data aggregation, data cleanse, data transformation, and feature selection and reduction, so as to make OT data available for enrichment, correlation and security analysis.

For the data after data preparation, the data processing device 402 may further perform post-processing of enrichment and data fusion and correlation to analyze and integrate data from different data sources and of different data types, so as to obtain comprehensive information. For example, enrichment comprises: adding background information such as geographic location, whois information, domain name information, etc. to key information such as IP address, domain name, email address, or file hash, and making it useful for further correlation or analysis. For example, data fusion and correlation comprise: fusing and correlating a large number of heterogeneous security logs into a series of security events or behavior sequences, or fusing and correlating the security logs with other types of data (such as full packet network traffic and NetFlow).

The data processing device 402 can perform real-time anomaly detection on the data after data preparation and the data after post-processing according to a preset machine learning algorithm, such as identifying an abnormal security event or behavior.

The data processing device 402 may further perform statistics of the key features of the data after data preparation and the data after post-processing for visual display of the key features. For example, these key features include: the numbers of security logs from different data sources and of different types for each OT field environment within unit time; the numbers of security logs of different types recorded based on source IP within unit time; the numbers of security logs of different types recorded based on destination IP within unit time; the numbers of security logs of different types recorded based on behavior type within unit time; statistics of different IPs having access to other IPs through different protocols, and so on.

The original data, the data after data preparation and the post-processed data are stored as the first data in the storage device 403.

Preferably, the storage device 403 comprises at least one of the following:
(1) one or more distributed file systems for storing unstructured first data;
(2) one or more search-oriented databases for storing structured first data;
(3) one or more file databases for storing first data with a complex structure; and
(4) one or more image databases for storing first data in a graphic format.

Specifically, the storage device 403 has a persistent data storage capability, and stores different types of original data, data after data preparation and post-processed data by means of the characteristics of different types of databases.

For example, the storage device 403 comprises the file systems or HDFS for storing the original data. The original data specifically include: network traffic (PCAP file); various related files, including various HTML files, pictures and PKI certificates extracted from network traffic; and various web pages, pictures, certificates, binary files, etc. obtained by the crawler from the Internet.

For example, the storage device 403 comprises ElasticSearch to store various text information such as indexes, information and features extracted from the original data. The text information includes: security related logs from IDS, log collection components (collected from an upper computer, firewall, switch/router and controller); session information and NetFlow data extracted from a PCAP file; and text information such as keywords extracted from web pages and certificates. For another example, MongoDB is used for storing structured information or results which are correlated, enriched and analyzed.

For example, the storage device 403 comprises Neo4j for storing knowledge graph-oriented graph data such as threat/risk (attacker) images.

The analysis device 404 acquires the first data from the storage device 403, parses out first features of the first data, identifies an abnormal feature from the first features, acquires second data related to the abnormal feature from the data storage area, and generates an algorithm model based on the second data, wherein the algorithm model is used for identifying an attack behavior related to the abnormal feature.

Refer to the related detailed description of FIG. 2 for specific implementation of the analysis device 404. Moreover, the analysis device 404 sends the algorithm model to the data processing device 402. The data processing device 402 is further configured to update the machine learning algorithm based on the algorithm model. After the data processing device 402 updates the machine learning algorithm based on the algorithm model, even if the related attack behavior of the abnormal feature is a novel attack behavior, the related attack behavior can still be normally identified by the data processing device by means of the algorithm model.

According to the embodiment of the invention, network security analysis of an OT can be achieved through an analysis system for an OT system. In the embodiment of the invention, the analysis system may be located inside the OT system, and may also be located outside the OT system.

Figure 5:
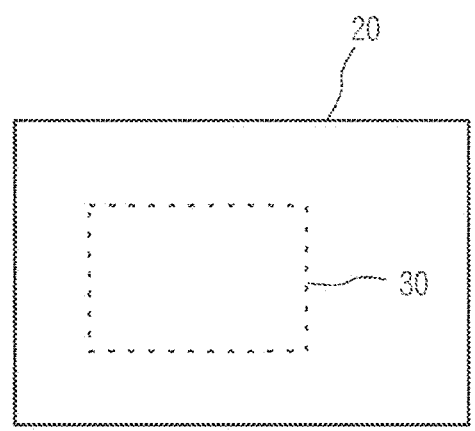
FIG. 5 shows a first example way to deploy an analysis system according to an embodiment of the invention to an OT system.
Figure 6:
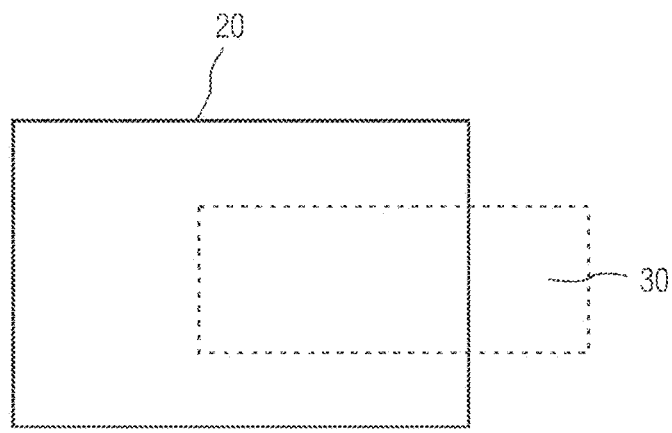
FIG. 6 shows a second example way to deploy an analysis system according to an embodiment of the invention to an OT system.
Figure 7:
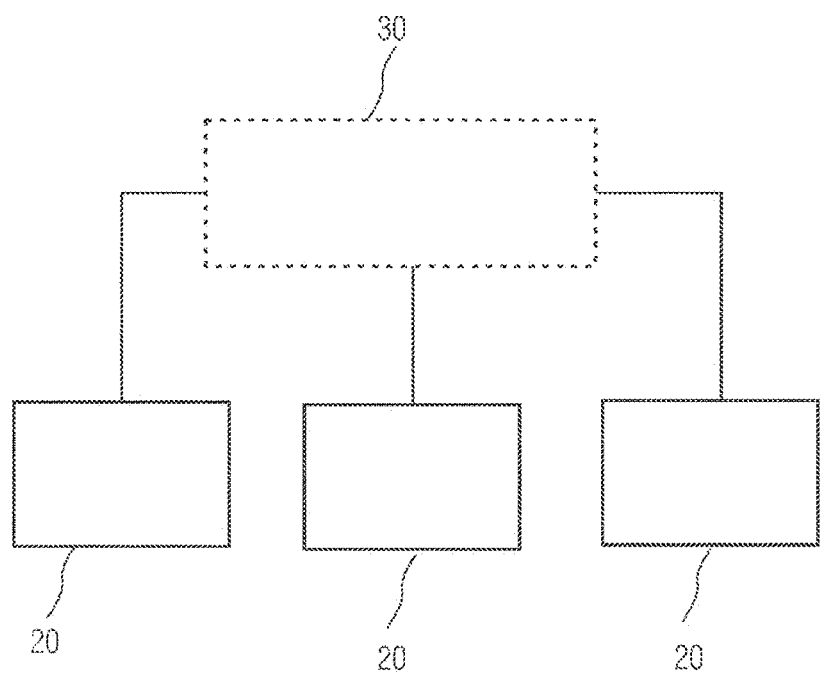
FIG. 7 shows a third example way to deploy an analysis system according to an embodiment of the invention to an OT system.

FIG. 5 to FIG. 7 show three example ways to deploy an analysis system according to an embodiment of the invention to an OT system.

In FIG. 5, the analysis system 30 shown in FIG. 4 is located inside the OT system 20 shown in FIG. 1.

In FIG. 6, some of the devices in the analysis system 30 shown in FIG. 4 are located inside the OT system 20 shown in FIG. 1, and some devices are located outside the OT system 20 shown in FIG. 1.

In FIG. 7, the analysis system 30 shown in FIG. 4 is located outside the OT system 20 shown in FIG. 1. The analysis system 30 can be used for monitoring the network security of one OT system 20 and can also be used for monitoring the network security of two or more OT systems 20. The analysis system 30 can implement network security analysis of the OT system 20 by at least one server and analysis software deployed thereon.

The detailed process of the analysis system for the OT system is described below by taking the situation that the first data contain security logs as an example.

Figure 8:
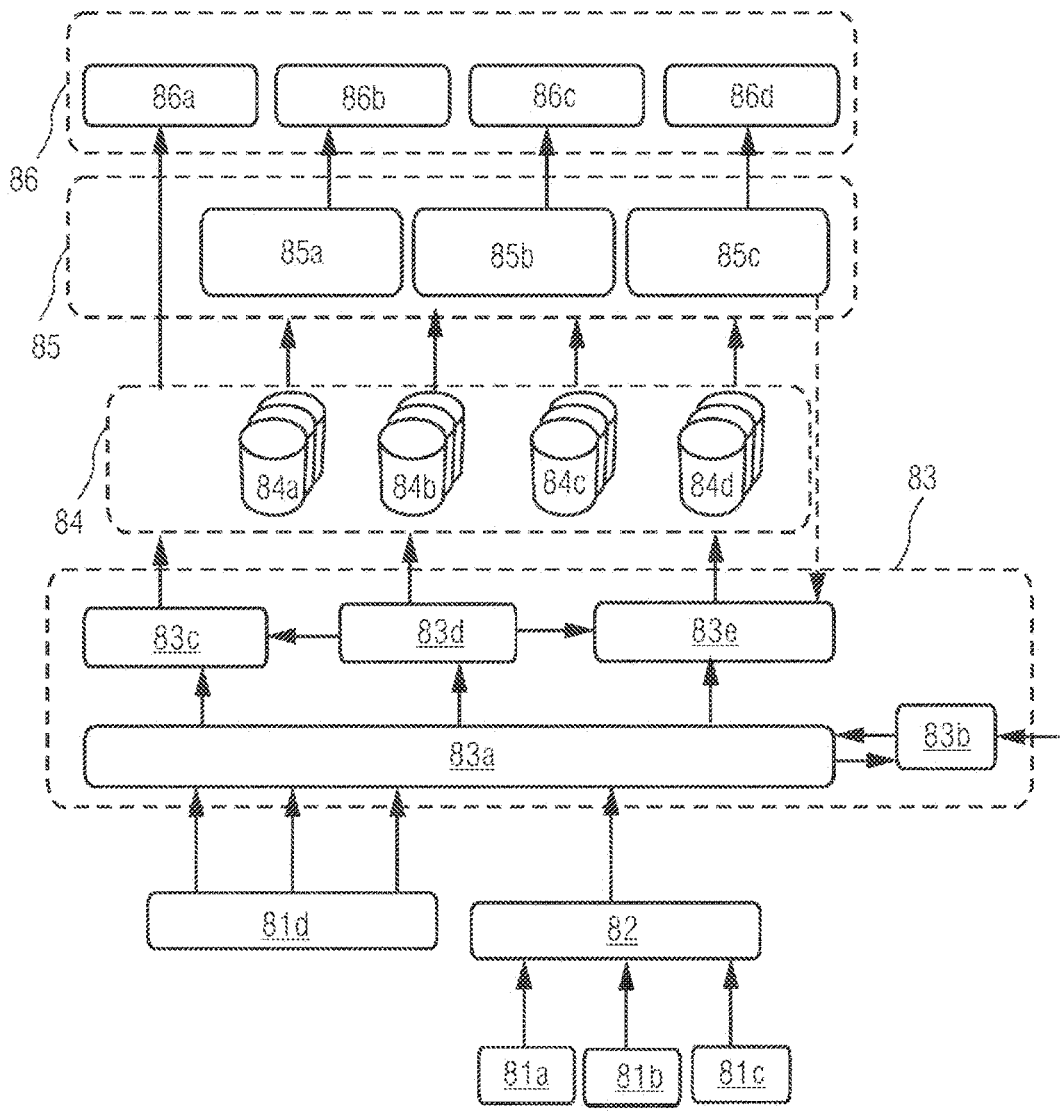
FIG. 8 is a functional architecture diagram of an analysis system for an OT system according to an embodiment of the invention.

FIG. 8 is a functional architecture diagram of an analysis system for an OT system according to an embodiment of the invention.

In FIG. 8, data acquisition processing 82 deployed at an OT field (such as a digital plant) obtains original data from multiple data sources. The data sources specifically include:
(1) a field intrusion detection system 81*c* deployed in an OT network to perform field analysis on network traffic, wherein an intrusion analysis system sends analysis results to the data acquisition device in the form of security logs;
(2) a log collection system deployed in the OT system, for example, the log collection system collects logs from an upper computer 81*a* and collects security logs from a server 81*b*. The log collection system may also collect security related logs from OT assets such as switches, routers, firewalls and controllers, and forward the security related logs to the data acquisition processing 82.

The security logs from different OT fields (factories and workshops) are first aggregated to the same data acquisition processing 82, which forwards the security logs to data flow processing 83.

A crawler-based Internet intelligence collecting module crawls threat (attacker) related information on the Internet (and Deep Web or DarkNet), such as a security log 81*d* crawled from the Internet, and forwards the information to the data flow processing 83 in the form of security logs.

After receiving the security logs from different OT fields and the Internet, the data flow processing 83 may perform data preparation processing 83*a* on original logs based on a streaming engine (such as Flink and Storm), specifically comprising:
(1) data aggregation, that is, integrating logs from different OT fields for processing;
(2) data cleanse, that is, checking, adding, amending and deleting (if necessary) the original logs from different OT fields and the Internet, and specific operations include: correcting or deleting malformed logs, adding or deleting missing log fields, and so on;
(3) data transformation, due to the fact that logs from different data sources (Windows logs, firewalls/WAF, routers/switches) have different formats and there are cases where similar fields have different field names, even the contents of the fields are different, similar fields need to be mapped into the same field name, and the field names of different fields needs to be standardized in a unified manner;
(4) feature selection and reduction, that is, extracting key information (fields or part of fields) from the security logs, specifically including source IP, source user name, destination IP, destination port, and destination file/account/URI.

For the security logs after data preparation, the data flow processing 83 further performs data enrichment processing 83*b* on the streaming computing engine based on the key information extracted from the logs, specifically comprising:
(1) for an internal IP, obtaining the asset information corresponding to the IP by querying an asset table in a database, such as host name, operating system type, application type, owner and location of deployment;
(2) for an external IP, querying the geographic location information of the IP through GeoIP, querying the domain name information associated with the IP through reverse DNS, and querying whether the IP has a history of malicious behaviors through threat intelligence sources, and so on;
(3) for a domain name, querying the information of the owner of the domain name through Whois, and querying whether the domain name has a history of malicious behaviors through threat intelligence sources, and so on;
(4) for a certificate or file, querying whether the certificate or file is related to a known malicious behavior through threat intelligence sources, and so on;
(5) other enrichment query.

At the same time, the data flow processing 83 also performs data fusion and correlation processing 83*d* on the security logs after the data preparation processing 83*a*, and analyzes and integrates the security logs from different data sources to obtain comprehensive log information. For example, during an intrusion activity of a malicious IP, digital traces may be left on the firewall, WAF, router/switch, IDS, upper computer and the like (in the form of security logs). Data fusion and correlation are to identify the correlation between these security logs and fuse and correlate a large number of heterogeneous security logs into a series of security events or behavior sequences. In addition to the fusion and correlation between security logs from different data sources, the data fusion and correlation operation 83*d* also comprises the fusion and correlation of security logs with other types of data (such as full packet network traffic and NetFlow).

For the security logs after the data preparation processing and the security event or behavior sequence data after fusion and correlation, the data flow processing 83 also uses a flow analysis plug-in 83*c* for statistics of the key features of inbound security logs, specifically including:
(1) the numbers of security logs from different data sources and of different types for each OT field environment within unit time;
(2) the numbers of security logs of different types recorded based on source IP within unit time;
(3) the numbers of security logs of different types recorded based on destination IP within unit time;
(4) the numbers of security logs of different types recorded based on behavior type within unit time;
(5) statistics of different IPs having access to other IPs through different protocols;
(6) and so on.

For the security logs after the data preparation processing 83*a* and the security event or behavior sequence data after the data fusion and correlation operation 83*d*, the data flow processing 83 also supports the use of different machine learning algorithms 83*e* (such as unsupervised learning, reinforcement learning and grammatical inference) on the streaming engine to process the security logs and the security event or behavior sequence data, and identify abnormal security events or behaviors therefrom.

In addition, the input original security logs and various results obtained through the data flow processing 83 are stored in a data lake 84. The data lake 84 is used as a persistent storage method to store different types of original, intermediate, or result data by means of the characteristics of different types of databases.

For example, the data lake 84 may comprise:
(1) a distributed file system 84*a* or HDFS for storing various files as the original data, specifically including: network traffic (PCAP file); various related files, including various HTML files, pictures and PKI certificates extracted from network traffic; and various web pages, pictures, certificates, binary files, etc. obtained by the crawler from the Internet;

(2) ElasticSearch 84*b* for storing various text information such as indexes, information and features extracted from the original data, specifically including: security related logs from IDS, log collection components (collected from an upper computer, firewall, switch/router and controller); session information and NetFlow data extracted from a PCAP file; and text information such as keywords extracted from web pages and certificates;

(3) MongoDB 84*c* for storing structured information or results which are correlated, enriched and analyzed;

(4) a graph database 84*d* (for example, Neo4j) for storing knowledge graph-oriented graph data such as threat/risk (attacker) images.

Based on various data stored in the data lake 84, security analysis processing 85 can further analyze the historical data of the security logs (and other types of data), specifically including: (1) obtaining the time trend graph of the logs through statistics and comparing the graph with a historical average; (2) obtaining the ratio distribution of the numbers of different types of logs through statistics; (3) obtaining a predetermined number of maximum security risk events in each OT environment through statistics; (4) extracting associated security events and behavior sequences, and mapping the associated security events and behavior sequences onto a time shaft.

Based on the above analysis, the security analysis processing 85 displays analysis results to security analysts through a situation awareness dashboard 86*c* of visual processing 86 in a visual manner, such as a time trend graph, a TreeMap, a Top security risk event, and a Sankey graph, allowing the security analysts to identify abnormal behaviors from massive security data (such as security logs).

The security analysis processing 85 can also combine the intelligence of the security analysts with the artificial intelligence of the system based on security situation awareness and visualization, and the workflow is as follows:

(1) first, the overview or overall situation of the monitored OT field environment is displayed to the security analysts through the situation awareness dashboard 86*c*, and the signs of anomaly which are of concern are graphically highlighted;

(2) then, the security analysts can zoom and filter relevant data and statistics on the situation awareness dashboard 86*c* based on the signs of anomaly, and perform exploration and discovery in the data to identify the scope, nature and other information of abnormal data;

(3) finally, the security analysts can use an exploratory data analysis interactive interface 86*d* in the visual processing 86 to extract more detailed data from the data lake 84, or even original data, and use the EDA and digital forensic technologies to perform an in-depth and comprehensive analysis on the anomaly.

In asset visualization 86*a* belonging to the scope of the visual processing 86, the asset information of the OT system stored in the data lake 84 is visually displayed. In threat visualization 86*b* belonging to the scope of the visual processing 86, the abnormal data are visually presented.

For anomalies specific to the OT system (whether they are caused by an abuse of internal personnel, or malware infection, or external scanning, vulnerability exploitation, lateral movements, etc.), when the security analysts complete analysis with the EDA and criminal forensics technologies, the analysis device can convert an analysis result into a specific algorithm.

For example, the security analysis processing 85 extracts: (1) statistical features of abnormal security events or behaviors; (2) an indicator of compromise represented by an abuse and the attack behavior; (3) fingerprints of the attack behavior (scanning, vulnerability exploitation and the like); (4) an artificial customization algorithm for accurately detecting anomalies from relevant data such as the security logs; (5) a classification and identification algorithm which is obtained through training and can identify the abnormal behavior from the data of the security logs, etc.

On this basis, the security analysis processing 85 integrates these features, IOC, fingerprints, artificial customization algorithm and classification and identification algorithm into an algorithm model, and sends the algorithm model to the machine learning algorithm 83*e*. In this way, when similar attack behaviors occur in the future, time-consuming energy-draining manual analysis of the security analysts is not needed any more, the machine learning algorithm 83*e* can automatically complete the identification, classification and alarm of the attack behaviors, thereby realizing complementation of the advantages of human intelligence and the advantages of artificial intelligence.

Based on the above description, the embodiment of the invention also provides an analysis method for an OT system.

Figure 9:
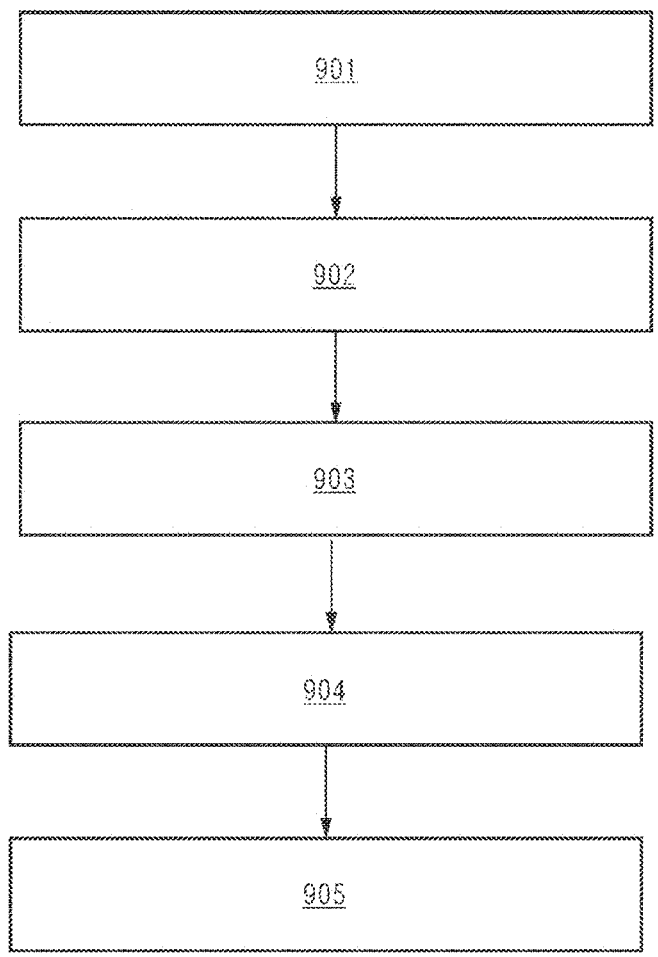
FIG. 9 is a flow chart of an analysis method for an OT system according to an embodiment of the invention.

FIG. 9 is a flow chart of an analysis method for an OT system according to an embodiment of the invention.

As shown in FIG. 9, the method comprises:

step 901: collecting the original data of the OT system;

step 902: performing data preparation on the original data, performing real-time anomaly detection on the data after data preparation according to a machine learning algorithm, and performing post-processing on the data after data preparation;

step 903: providing first data related to the OT system, wherein the first data comprise the original data, the data after data preparation, and the post-processed data;

step 904: acquiring the first data related to the OT system, parsing out first features of the first data, identifying an abnormal feature from the first features, acquiring second data related to the abnormal feature from the data storage area, and generating an algorithm model based on the second data, where the algorithm model is used for identifying an attack behavior related to the abnormal feature; and step 905: updating the machine learning algorithm in step 902 based on the algorithm model.

The embodiment of the invention also provides an analysis device for an OT system.

Figure 10:
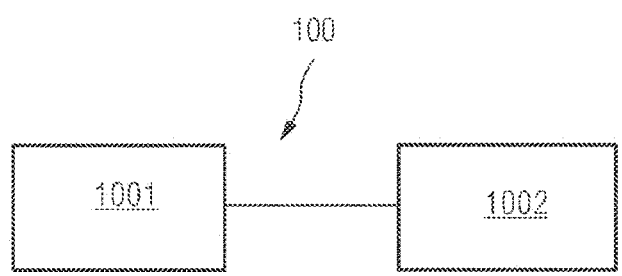
FIG. 10 is a structure diagram of an analysis device for an OT system according to an embodiment of the invention.

FIG. 10 is a structure diagram of an analysis device for an OT system according to an embodiment of the invention.

In FIG. 10, the analysis device for the OT system comprises a processor 1001 and a memory 1002, and an application executable by the processor 1001 is stored in the memory 1002 for causing the processor 1001 to perform the analysis method for the OT system according to any one of the above items.

It should be noted that not all the steps and modules in the above-mentioned processes and structure diagrams are required, and certain steps or modules may be omitted according to actual needs. The execution order of each step is not fixed and can be adjusted as needed. The division of each module is only functional division for ease of description. In actual implementation, one module can be divided into multiple modules, the functions of multiple modules can also be realized by one module, and these modules can be located in the same device and can also be located in different devices.

The hardware modules in various embodiments may be implemented mechanically or electronically. For example, a hardware module may comprise a specially designed permanent circuit or logic device (such as a dedicated processor, like an FPGA or ASIC) for performing certain operations. A hardware module may also comprise a programmable logic device or circuit temporarily configured by software (for example, comprising a general-purpose processor or other programmable processors) for performing certain operations. Whether to adopt a mechanical method, or a dedicated permanent circuit, or a temporarily configured circuit (for example, configured by software) for the hardware module can be decided based on cost and time considerations.

The invention also provides a machine-readable storage medium storing instructions for causing a machine to perform the method as described herein. Specifically, a system or device equipped with a storage medium may be provided, a software program code for realizing the functions of any of the above embodiments is stored on the storage medium, and a computer (or CPU or MPU) of the system or device is made to read out and execute the program code stored in the storage medium. In addition, some or all of the actual operations may be performed by an operating system or the like operating on a computer based on instructions of the program code. The program code read out from the storage medium may also be written into a memory arranged in an expansion board inserted into the computer or written into a memory arranged in an expansion unit connected to the computer, and then some or all of the actual operations are executed by a CPU or the like installed on the expansion board or the expansion unit based on the instructions of the program code, so as to achieve the functions of any of the above-described embodiments.

The storage medium for providing the program code can be implemented as floppy disk, hard disk, magneto-optical disk, optical disk (such as CD-ROM, CD-R, CD-RW, DVD-ROM, DVD-RAM, DVD-RW, DVD+RW), magnetic tape, non-volatile memory card and ROM. Alternatively, the program code may be downloaded from a server computer or cloud through a communication network.

The above description is only the preferred embodiments of the invention and is not intended to limit the protection scope of the invention. Any modification, equivalent replacement and improvement made within the spirit and principle of the invention shall fall within the protection scope of the invention.

It should be noted that not all the steps and modules in the above-mentioned processes and system structure diagrams are required, and certain steps or modules may be omitted according to actual needs. The execution order of each step is not fixed and can be adjusted as needed. The system structures described in the foregoing embodiments may be physical structures or logical structures, that is, some modules may be implemented by the same physical entity, or some modules may be implemented by multiple physical entities, or may be implemented by certain components in multiple independent devices together.

In the above embodiments, a hardware unit may be implemented mechanically or electrically. For example, a hardware unit may comprise a permanent dedicated circuit or logic (such as a dedicated processor, like an FPGA or ASIC) for performing corresponding operations. A hardware unit may also comprise a programmable logic or circuit (such as a general-purpose processor or other programmable processors) which can be temporarily configured by software to perform corresponding operations. The specific implementation method (a mechanical method, or a dedicated permanent circuit, or a temporarily configured circuit) can be decided based on cost and time considerations.

The invention has been illustrated and described in detail with reference to the accompanying drawings and preferred embodiments. However, the invention is not limited to these disclosed embodiments, and based on the above embodiments, those skilled in the art can understand that the code auditing means in the above different embodiments can be combined to obtain more embodiments of the invention, and these embodiments also fall within the protection scope of the invention.

What is claimed is:

1. An analysis method for an operational technology system, comprising:
    acquiring first data related to the operational technology system from a data storage area, and parsing out first features of the first data;
    identifying an abnormal feature from the first features; and
    acquiring second data related to the abnormal feature from the data storage area, and generating an algorithm model based on the second data, wherein the algorithm model is usable for identifying an attack behavior related to the abnormal feature, and wherein the generating of the algorithm model based on the second data comprises:
        determining a first statistical feature of an abnormal security event related to the abnormal feature;
        determining a second statistical feature of an abnormal security behavior related to the abnormal feature;
        determining fingerprints of an attack behavior related to the abnormal feature;
        determining, based on an artificial customization method, an artificial customization algorithm for detecting the abnormal security event related to the abnormal feature;
        determining, based on a machine learning method, a classification and identification algorithm for detecting the abnormal security event related to the abnormal feature; and
        generating the algorithm model by aggregating at least the first statistical feature, the second statistical feature, the fingerprints, the artificial customization algorithm, and the classification and identification algorithm.

2. The analysis method of claim 1, wherein the first data contain security logs of the operational technology system; and wherein
    the parsing of first features of first data includes at least one of:
    parsing out a real-time trend of the security logs as the first feature;
    parsing out a historical average of the security logs as the first feature;
    parsing out a type distribution of the security logs as the first feature; and
    parsing out a time sequence related to an industrial control application operation in the security logs as the first feature.

3. The analysis method of claim 1, wherein the first data contain associated data of security logs of the operational technology system; and
wherein
the parsing of first features of first data includes at least one of:
extracting a number of security risk events from the associated data as the first feature;
extracting security events from the associated data as the first feature; and
extracting a behavior sequence from the associated data as the first feature, wherein the behavior sequence contains a plurality of associated security events.

4. The analysis method of claim 1, wherein the first data contain network traffic of the operational technology system; and wherein
the parsing of first features of first data includes at least one of:
parsing out a domain name system request within a first period in the network traffic as the first feature;
parsing out a hypertext transfer protocol request within a second period in the network traffic as the first feature;
parsing out a domain permission query request within a third period in the network traffic as the first feature; and
parsing out an industrial control protocol access request within a fourth period in the network traffic as the first feature.

5. The analysis method of claim 1, wherein the first data contain associated data of network traffic of the operational technology system; and
wherein
the parsing of first features of first data includes at least one of:
extracting a number of security risk events from the associated data as the first feature;
extracting security events from the associated data as the first feature; and
extracting a behavior sequence from the associated data as the first feature, wherein the behavior sequence contains a plurality of associated security events.

6. The analysis method of claim 1, further comprising:
displaying the first features on a visual interface;
wherein the identifying of the abnormal feature from first features comprises:
identifying an abnormal feature from the first features based on an interaction instruction triggered on the visual interface; and
wherein the acquiring of the second data related to the abnormal feature from a data storage area comprises:
performing data mining on the abnormal feature in the data storage area to obtain the second data based on a second interaction instruction triggered on the visual interface.

7. The analysis method of claim 6, wherein
the data mining of abnormal feature includes at least one of:
performing zooming on data associated with the abnormal feature;
performing filtration on data associated with the abnormal feature;
performing exploration and discovery on data associated with the abnormal feature; and
performing forensics analysis on data associated with the abnormal feature.

8. An analysis system for an operational technology system, comprising:
a data acquisition device configured to collect original data of the operational technology system;
a data processing device configured to
perform data preparation on the original data,
perform post-processing on the data after data preparation, and
perform real-time anomaly detection on the data after data preparation and the data after post-processing according to a machine learning algorithm;
a storage device configured to provide first data related to the operational technology system, wherein the first data includes the original data, the data after data preparation, and the post-processed data; and
an analysis device configured to
acquire first data related to the operational technology system,
parse out first features of the first data,
identify an abnormal feature from the first features,
acquire second data related to the abnormal feature from the storage device,
generate an algorithm model based on the second data,
determine a first statistical feature of an abnormal security event related to the abnormal feature;
determine a second statistical feature of an abnormal security behavior related to the abnormal feature;
determine fingerprints of an attack behavior related to the abnormal feature;
determine, based on an artificial customization method, an artificial customization algorithm for detecting the abnormal security event related to the abnormal feature;
determine, based on a machine learning method, a classification and identification algorithm for detecting the abnormal security event related to the abnormal feature;
generate the algorithm model by aggregating at least the first statistical feature, the second statistical feature, the fingerprints, the artificial customization algorithm, and the classification and identification algorithm; and
send the algorithm model to the data processing device, wherein the algorithm model is used for identifying an attack behavior related to the abnormal feature; and
wherein the data processing device is further configured to update the machine learning algorithm based on the algorithm model.

9. The analysis system of claim 8, wherein the data acquisition device includes at least one network sensor arranged in the operating technology system for acquiring at least one original datum transmitted in the operational technology system; and wherein the original data include at least one of the following:
host security logs collected from a human machine interface, a workstation or an operational technology environment server;
security logs collected from anti-virus software or a data leakage protection agent;
security logs collected from an industrial network device;
security logs collected from an industrial network security product;
network traffic collected from an industrial network;
threat intelligence collected from a commercial threat intelligence source code or an open source threat intelligence source;
audit data associated with security events collected from operational technology equipment; and
data collected from a third party.

10. The analysis system of claim 8, wherein the storage device includes at least one of:
- a distributed file system for storing unstructured first data;
- a search-oriented database for storing structured first data;
- a file database for storing first data with a complex structure; and
- a graph database for storing first data which is of a graph structure including nodes and sides for connecting the nodes.

11. An analysis device for an operational technology system, comprising:
- a processor; and
- a memory;
- wherein an application executable by the processor is stored in the memory, for causing the processor to, when executed, perform at least:
  - acquiring first data related to the operational technology system from a data storage area, and parsing out first features of the first data;
  - identifying an abnormal feature from the first features; and
  - acquiring second data related to the abnormal feature from the data storage area, and generating an algorithm model based on the second data, where the algorithm model is used for identifying an attack behavior related to the abnormal feature, and
  - wherein the generating of the algorithm model based on the second data includes:
    - determining a first statistical feature of an abnormal security event related to the abnormal feature;
    - determining a second statistical feature of an abnormal security behavior related to the abnormal feature;
    - determining fingerprints of an attack behavior related to the abnormal feature;
    - determining, based on an artificial customization method, an artificial customization algorithm for detecting the abnormal security event related to the abnormal feature;
    - determining, based on a machine learning method, a classification and identification algorithm for detecting the abnormal security event related to the abnormal feature; and
    - generating the algorithm model by aggregating at least the first statistical feature, the second statistical feature, the fingerprints, the artificial customization algorithm, and the classification and identification algorithm.

12. The analysis device of claim 11, wherein the first data contain security logs of the operational technology system and wherein the parsing of first features of first data includes at least one of:
- parsing out a real-time trend of the security logs as the first feature;
- parsing out a historical average of the security logs as the first feature;
- parsing out a type distribution of the security logs as the first feature; and
- parsing out a time sequence related to a predetermined industrial control application operation in the security logs as the first feature.

13. The analysis device of claim 11, wherein the first data contain associated data of security logs of the operational technology system; and
- wherein the parsing of first features of first data includes at least one of
  - extracting a number of security risk events from the associated data as the first feature;
  - extracting security events from the associated data as the first feature; and
  - extracting a behavior sequence from the associated data as the first feature, wherein the behavior sequence contains a plurality of associated security events.

14. The analysis device of claim 11, wherein the first data contain network traffic of the operational technology system; and wherein the parsing of first features of first data includes at least one of:
- parsing out a domain name system request within a first period in the network traffic as the first feature;
- parsing out a hypertext transfer protocol request within a second period in the network traffic as the first feature;
- parsing out a domain permission query request within a third period in the network traffic as the first feature; and
- parsing out an industrial control protocol access request within a fourth period in the network traffic as the first feature.

15. The analysis device of claim 11, wherein the first data contain associated data of network traffic of the operational technology system;
- and wherein the parsing of first features of first data includes at least one of:
  - extracting a number of security risk events from the associated data as the first feature;
  - extracting security events from the associated data as the first feature; and
  - extracting a behavior sequence from the associated data as the first feature,
- wherein the behavior sequence contains a plurality of associated security events.

16. The analysis device of claim 11, further comprising:
- displaying the first features on a visual interface;
- wherein the identifying of the abnormal feature from first features includes:
  - identifying an abnormal feature from the first features based on an interaction instruction triggered on the visual interface; and
- wherein the acquiring of the second data related to the abnormal feature from the data storage area includes:
  - performing data mining on the abnormal feature in the data storage area to obtain the second data based on a second interaction instruction triggered on the visual interface.

17. The analysis device of claim 16, wherein the data mining of abnormal feature includes at least one of:
- performing zooming on data associated with the abnormal feature;
- performing filtration on data associated with the abnormal feature;
- performing exploration and discovery on data associated with the abnormal feature; and
- performing forensics analysis on data associated with the abnormal feature.

* * * * *